Figure 1:
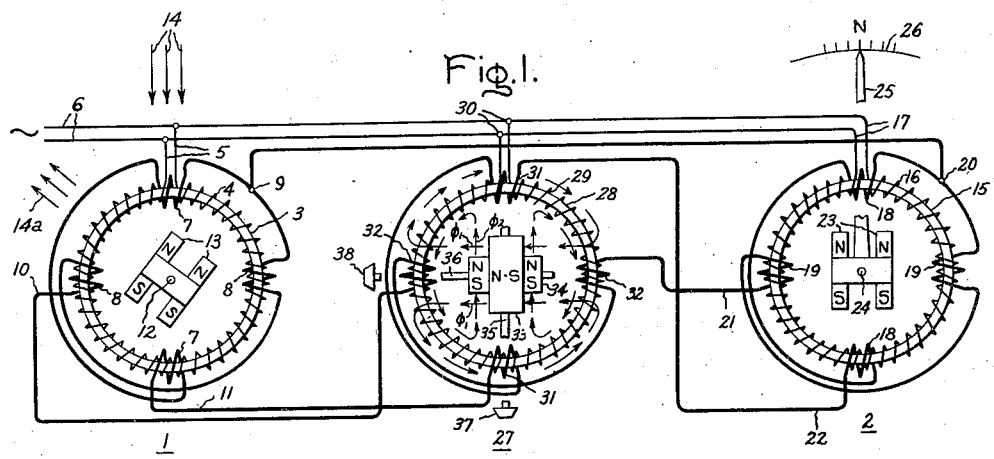

Aug. 26, 1947.   A. T. SINKS   2,426,470
REMOTE INDICATING MAGNETIC COMPASS SYSTEM
Filed July 30, 1945   2 Sheets-Sheet 1

Inventor:
Allen T. Sinks, Deceased,
Anna C. Sinks, Administratrix,
by
Attorney.

Aug. 26, 1947.   A. T. SINKS   2,426,470
REMOTE INDICATING MAGNETIC COMPASS SYSTEM
Filed July 30, 1945   2 Sheets-Sheet 2
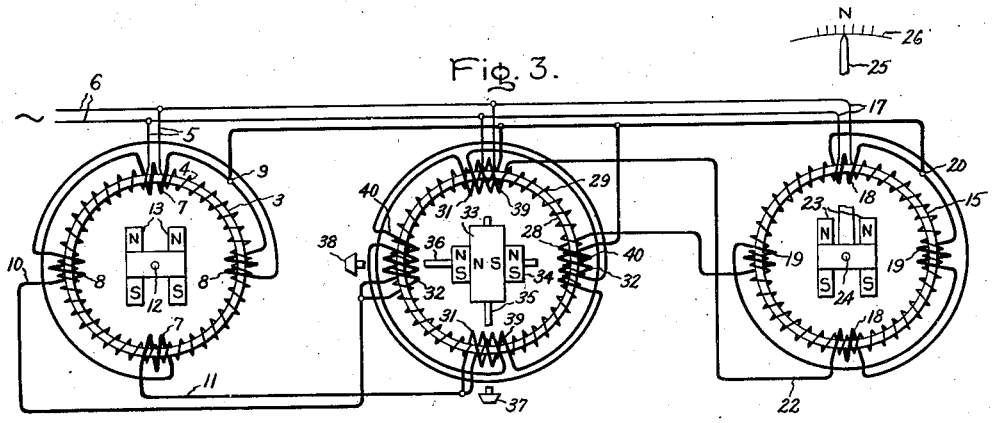
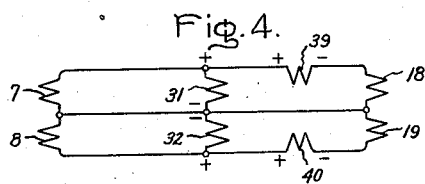
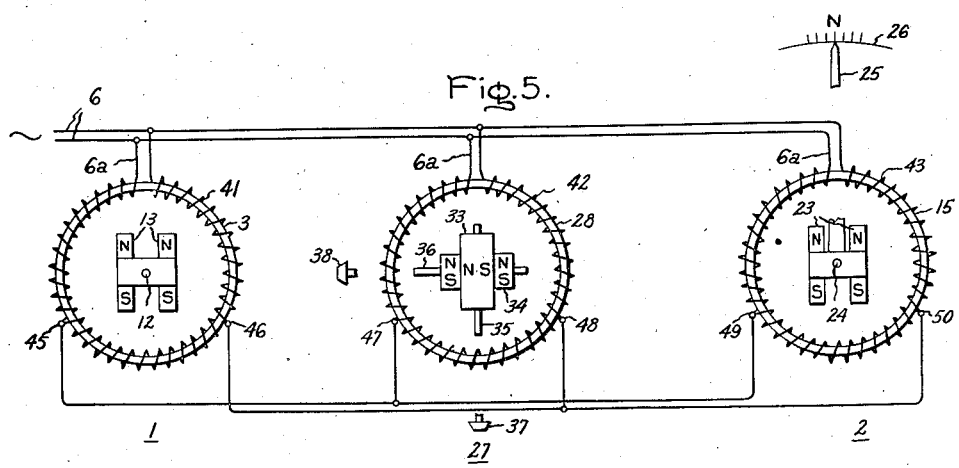
Inventor:
Allen T. Sinks, Deceased,
Anna C. Sinks, Administratrix,
by  *Claude A. Mott*
Attorney.

Patented Aug. 26, 1947

2,426,470

UNITED STATES PATENT OFFICE 2,426,470

REMOTE INDICATING MAGNETIC COMPASS SYSTEM

Allen T. Sinks, deceased, late of Beach Bluff, Mass., by Anna C. Sinks, administratrix, Beach Bluff, Mass., assignor to General Electric Company, a corporation of New York Application July 30, 1945, Serial No. 607,717

9 Claims. (Cl. 33—225)

The present invention relates to remote-indicating magnetic compass systems, and more particularly to an improved deviation compensator arrangement whereby the system is compensated for the effect of a permanent magnetic field in the vicinity of the compass transmitter.

Remote indicating compass systems are now widely used on moving vehicles such as aircraft for indicating the direction of the earth's magnetic field at one or more indicator stations located remote from the compass transmitter unit. Usually the moving vehicle on which the compass system is mounted has a certain amount of permanent magnetism which tends to distort the earth's magnetic field so that the compass, in the absence of any compensator, does not indicate the true direction of the magnetic meridian. Hence it is customary to provide some form of compensating arrangement usually referred to as a deviation compensator for compensating for the effect of the vehicle's permanent magnetism on the compass. Usually deviation compensation is accomplished by the provision of a number of auxiliary permanent magnets adjacent the compass transmitter which may be adjustably oriented relative to the compass so that they produce a local magnetic field having a direction and magnitude such that it completely counteracts the effect of the vehicle's permanent magnetism, leaving the compass magnet free to swing into alignment with the true magnetic meridian.

In installations of remote indicating compass systems on aircraft, the compass transmitter is usually located in a remote inaccessible spot such as a wing tip or a remote part of the fuselage, and for that reason it is not convenient to use a deviation compensator which requires access to the compass transmitter unit. Therefore in aircraft installations it is particularly advantageous to have a deviation compensator which can be adjusted at a location remote from the compasss transmitter.

An object of the present invention is to provide an improved remote indicating compass system having a deviation compensator which can be adjusted at a location remote from the compass transmitter.

Another object of the invention is to provide a deviation compensator which can be easily attached to a standard second-harmonic type of remote indicating compass system, and which can be installed at any desirable location.

A further object of the invention is to provide a deviation compensator which can be attached to the electrical wiring extending between the transmitter and indicator unit of a second harmonic type of remote indicating compass system without the necessity of access to the internal wiring of either the transmitter or indicator unit.

Further objects and advantages of the invention will become apparent and the invention will be better understood from the following description referring to the accompanying drawings and the features of novelty which characterize my invention will be pointed out with particularity in the claims annexed to and forming a part of this specification.

Figure 2:
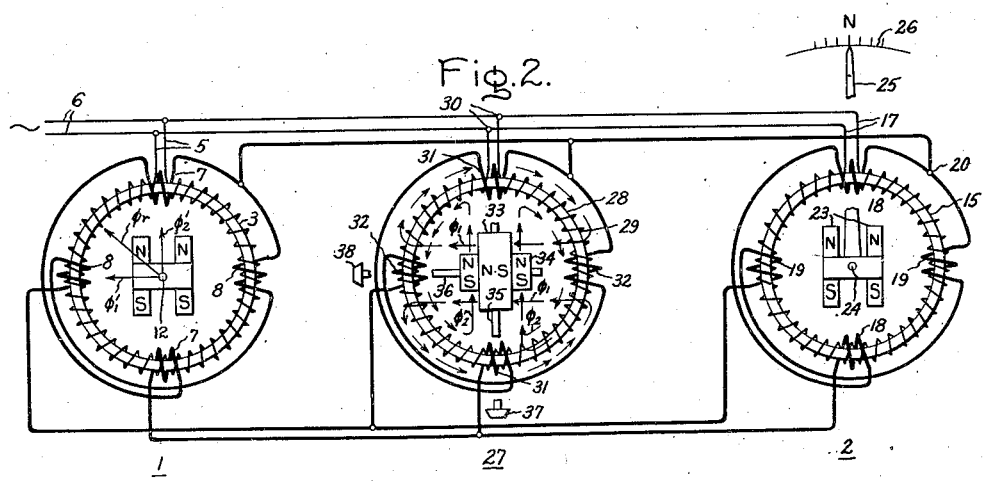

In the drawings, Fig. 1 is a schematic representation of a second harmonic type of remote indicating compass system having connected thereto a deviation compensator constructed in accordance with the present invention; Fig. 2 is a modification in which a different wiring arrangement is used for connecting the compensator; Fig. 3 is a modified arrangement in which the compensator is provided with an additional winding for preventing the flow of compensating current in the indicator unit; Fig. 4 is a simplified wiring diagram of the arrangement shown in Fig. 3; and Fig. 5 shows the deviation compensator applied to a second harmonic compass system utilizing an autotransformer type of winding arrangement.

Referring to Fig. 1 of the drawing, there is shown a remote indicating compass system of the type now widely used on aircraft comprising a transmitter unit 1 and a remote indicator unit 2. The compass transmitter unit is shown as comprising an annular core 3 of magnetically permeable material such as "Mumetal," the core having wound thereon an exciting winding 4, the end connections 5 of which are connected to a suitable source of alternating current 6. Also wound upon the core 3 are two sets of coupling windings 7 and 8, each set comprising a pair of diametrically opposite grouped windings which are connected in series as shown. The windings 7 and 8 have a common connection 9, and the remaining connections are brought out at points 10 and 11. The connections 5 leading to the exciting winding 4 are termed single phase connections while the connections 9, 10, and 11 leading from the coupling windings 7 and 8 are referred to as polyphase connections.

Mounted for pivotal movement about the axis 12 of the core 3 are a pair of conventional compass magnets 13. Preferably a stabilizing means such as a conventional pendulum (not shown) is provided so that the compass magnets 13 rotate in a horizontal plane and therefore are positioned by the horizontal component of the earth's magnetic field which is represented by the arrows 14.

The compass magnets 13, being themselves strongly magnetized, act in effect as an amplifier of the earth's magnetic field and cause a strong magnetic flux to flow diametrically across the core 3 of the transmitter unit. The magnetic flux returns to the compass magnet through the core 3 and thereby links the coupling windings 7 and 8. The flow of alternating current in the exciting winding 4 causes a periodic saturation of the core which in turn causes a pulsation of the unidirectional magnetic flux flowing in the core from the magnets 13. The pulsating unidirectional magnetic flux in the core 3 causes second harmonic voltages to be induced in the coupling windings 7 and 8, the magnitudes of which vary approximately sinusoidally as the compass magnets 13 are rotated relative to the core. In the illustrated winding arrangement, the coupling windings 7 and 8 are arranged in quadrature relation.

The indicator unit 2 is electrically similar to the transmitter unit 1 and comprises a magnetically permeable core 15 having wound thereon an exciting winding 16 which corresponds to the transmitter winding 4 and which has single phase connections 17 which are connected to the alternating current supply 6. The core 15 is also provided with coupling windings 18 and 19 which correspond to the transmitter windings 7 and 8, and which are provided with polyphase connections 20, 21, and 22 electrically connected to the corresponding transmitter polyphase connections 9, 10, and 11. The indicator is also provided with a pair of permanent magnets 23 which are mounted for rotation about the axis 24 of the core 15.

The second harmonic remote indicating compass system thus far described is entirely conventional, and its operation will be understood by those skilled in the art. The second harmonic currents induced in the coupling windings 7 and 8 of the transmitter also flow in the coupling windings 18 and 19 of the indicator because they are connected in series circuit relation. These second harmonic currents in the indicator produce alternating current magnetic fluxes which are rectified by the periodic saturation of the core 15. The rectified magnetic flux flows diametrically across the indicator core 15 and due to the symmetry of the windings and connections of the transmitter and indicator units, the axis of this rectified magnetic flux remains in angular correspondence with the axis of the magnetic flux produced in the transmitter by the compass magnets 13. The indicator magnets 23 move into alignment with this unidirectional magnetic flux and as a result the compass magnets 13 and the indicator magnets tend to rotate in angular correspondence. A pointer 25 attached to the indicator magnet 23 therefore indicates on a stationary compass card 26 the compass heading of the vehicle on which the system is mounted.

The vehicle, such as an aircraft, on which the remote indicating compass system is mounted usually has a certain amount of permanent magnetism or carries on it one or more bodies which are permanently magnetized, and as a result there may be, and usually is, produced in the vicinity of the compass transmitter unit a fixed magnetic field which tends to distort the earth's magnetic field. In the absence of any compensation, this causes the compass magnets 13 and the indicator magnets 23 to turn away from the direction of the true magnetic meridian by an amount known as the deviation error. According to the present invention a deviation compensator 27 is provided which, when electrically connected between the transmitter and indicator units 1 and 2, acts to compensate the transmitter in such a way that indicator 2 indicates the true direction of the magnetic meridian.

The deviation compensator 27 is shown as comprising an annular core 28 of magnetically permeable material having wound thereon an exciting winding 29 which has single phase connections 30 energized from the alternating current supply 6. The core is also provided with coupling windings 31 and 32 which correspond to the coupling windings 7 and 8 of the transmitter, and coupling windings 18 and 19 of the indicator. In the embodiment of the invention shown in Fig. 1, the coupling windings 31 and 32 are connected in series circuit relation with the coupling windings 7 and 8 of the transmitter and the coupling windings 18 and 19 of the indicator. Thus it will be noted that the coupling windings 31 are connected in series with the connection running between the terminal 11 of the transmitter and the terminal 22 of the indicator, and the windings 32 are connected in series in electrical connection running between the terminal 10 of the indicator and the terminal 21 of the indicator.

Deviation compensation is obtained by causing second harmonic voltages to be induced in the compensator coupling windings 31 and 3? having magnitudes and polarities such that when these voltages are algebraically added to the voltage outputs of the transmitter coupling coils 7 and 8, the resultant voltages fed to the indicator coils 18 and 19 are such as to cause the indicator and the attached pointer 25 to indicate the true direction of the magnetic meridian. This compensation is based upon the theory that the deviation error in the indication of the compass magnet 13 can be represented in terms of voltages or currents induced in the transmitter coupling windings 7 and 8, and that when these voltage errors are added to or subtracted from the voltage output of the transmitter coupling windings, as the case may be, the indicator 2 will give the true indication of the direction of the magnetic meridian.

For the purpose of causing second harmonic voltages of adjustable magnitude and polarity to be induced in the compensator coupling windings 31 and 32, there is provided a magnet system by means of which a unidirectional magnetic flux of variable magnitude and polarity is caused to link the coupling windings 31 and 32. In the illustrated embodiment of the invention, the magnet system comprises two rotatably mounted cylindrically shaped permanent magnets 33 and 34, which are mounted on opposite sides of the core 28. The permanent magnet 33 is mounted on a rotatable shaft 35, the axis of which is in the direction of the diametric axis of the coupling coils 31 and the permanent magnet 34 is mounted on a rotatable shaft 36, the axis of which is in the direction of the diametric axis of the coupling coils 32 and is also perpendicular to the axis of the shaft 35. The permanent magnets 33 and 34 are magnetized across a diameter thereof as indicated by the polarity marks in the drawing so that by rotating the permanent magnets about their respective axes, the mutually perpendicular components of magnetic flux which they produce in the plane of the core 28 can be gradually varied from zero to a positive or negative direction dependent upon the direction and amount which the permanent magnets are rotated. Thus, the permanent magnet 33 produces a flux $\phi_1$ flowing diametrically across the core 28 and returning through the core so that it links the coupling windings 31 and the permanent magnet 34 produces a magnetic flux $\phi_2$ across the diameter of the core 28 which is perpendicular to the flux produced by the magnet 33 in the plane of the core and which returns by way of the core so that it links the compensator windings 32. The flow of exciting current in the compensator exciting winding 31 causes a periodic saturation of the core which in turn causes the unidirectional magnetic fluxes produced by the magnets 33 and 34 to pulsate whereby second harmonic voltages are induced in the compensator windings 31 and 32. Manually operated knobs 37 and 38 are provided by means of which the shafts 35 and 36 and the attached magnets 33 and 34 may be rotated to a position in which the flux produced by the magnets linking the compensator windings 31 and 32 has a magnitude and direction such that the second harmonic voltages induced in the windings 31 and 32 have the desired polarity and magnitude.

In use the compensator is installed at any convenient location which may, for example, be adjacent the indicator 2 and is electrically connected to the wires running between the transmitter and indicator units as shown in the drawing. It will be noted that the connections are such that it is unnecessary to have access to the internal wiring of either the transmitter or receiver units to make the installation, which is obviously a great advantage. In use, the knob 37 of the compensator is adjusted until the second harmonic voltage induced in the compensator coupling winding 31 is equal and opposite to the error voltage induced in the transmitter coupling winding 7 caused by deviation of the compass magnet 13 from the true magnetic meredian. Similarly, the knob 38 is adjusted until the second harmonic voltage induced in the compensator winding 32 is equal and opposite to the error voltage induced in the transmitter coupling windings 8. The compensating adjustment is accomplished by the same procedure as is used in compensating direct reading compasses; that is, by adjusting the compass on the north, south, east, and west headings to make the errors on these points the same after which all four errors are removed by either rotating the compass case or the indicator dial. The term error voltage is used to mean the magnetic deviation error in terms of the difference in the voltages induced in the coupling windings for the conditions of heading with deviation error and true heading without deviation error. Due to the fact that the compensator coupling windings are connected in series circuit relation with the transmitter coupling windings, the second harmonic voltages induced in the compensator and transmitter coupling windings are algebraically added so that the resultant voltage transmitted to the indicator windings is the same as if the compass magnet 13 occupied the direction of the true magnetic meridian. The compass needle 25 of the indicator therefore indicates the true magnetic bearing of the vehicle on which the remote indicating compass system is mounted even though the compass magnets are displaced by the amount of the magnetic deviation. In order to magnets 13 are shown in Fig. 1 as being deflected to the right of the true magnetic meridian indicated by the earth's field 14 such as would be the case if a permanently magnetized body in the vicinity of the transmitter produced a deviation field in the direction indicated by the arrows 14a. As explained above, the compensator 27 produces compensating voltages which, when algebraically added to the output of the transmitter 1, cause the indicator magnets 23 to swing to a position in which the needle 25 indicates true magnetic north as shown.

In the modification shown in Fig. 2 of the drawing, the compensator coupling windings 31 and 32 are connected in parallel with the transmitter coupling windings 7 and 8 and the indicator coupling windings 18 and 19, as distinguished from the series circuit connection of Fig. 1. With the parallel connection shown in Fig. 2, the compensator may be used to cause a flow of second harmonic currents in the transmitter coupling windings 7 and 8, whereby a unidirectional magnetic field is produced across the diameter of the core 3 in a direction and having a magnitude such that it completely cancels out the effect of the permanent magnet field caused by the presence of a magnetized body in the vicinity of the transmitter. Thus, for example, the knob 37 of the compensator may be adjusted until the second harmonic voltage induced in the compensator coupling winding 31 causes a flow of second harmonic current in the transmitter winding 7 which in turn causes a unidirectional magnetic flux $\phi_1'$ to flow across the diameter of the transmitter core 3 in the direction perpendicular to the diametric axis of the coupling coil 7. In a similar manner, the adjusting knob 38 of the compensator may be set to cause a second harmonic voltage to be induced in the coupling windings 32 of the compensator. This causes a corresponding second harmonic current to flow in the transmitter coupling coil 8 which produces a unidirectional magnetic flux $\phi_2'$, which flows across the transmitter core 3 in a direction perpendicular to the diametric axis of the coupling coil 8.

It will be clear from the foregoing that by adjusting the compensator knobs 37 and 38, the unidirectional flux components $\phi_1'$ and $\phi_2'$ of the transmitter may be controlled in the direction of magnitude so as to give a resultant field $\phi_r$ having the desired direction and magnitude. To obtain complete compensation of the permanent magnetic field, it is only necessary to adjust the compensator knobs 37 and 38 until the resulting unidirectional magnetic flux $\phi_r$ produced across the diameter of the transmitter core 3 is equal and opposite to the unidirectional flux produced across the transmitter core due to the permanent magnetism of the vehicle on which the compass transmitter is mounted and complete compensation is obtained. In this case the compass magnets 13 as well as the indicator magnets 23 indicate the direction of the true magnetic meridian.

A possible difficulty with the arrangement disclosed in Fig. 2 is that with the parallel connection the compensator 27 tends to cause the flow of compensating current in the indicator 2 as well as the transmitter unit 1, and when this occurs, a magnetic field may be produced across the diameter of the indicator core which tends to deflect the indicator magnet 23 from the proper position. This undesirable effect, howtically eliminated, by selecting the relative impedances of the transmitter and indicator windings such that the compensator current flowing in the indicator windings produces a magnetic flux which is approximately 90 degrees out of phase with the exciting flux in the indicator core which causes periodic saturation. With the second harmonic and exciting fluxes so shifted, no rectification of the alternating second harmonic flux occurs in the indicator core so that no unidirectional flux is produced to deflect the indicator magnet 23. This same principle of shifting the phase of the second harmonic flux relative to the exciting flux may be made use of to prevent feedback torque from the indicator to the transmitter as fully disclosed and claimed in a copending application of the present inventor Serial No. 510,614, filed June 9, 1942.

In Fig. 3 of the drawing, there is shown a modified arrangement by means of which the flow of compensator current in the indicator unit 2 is entirely prevented, thereby eliminating the need for utilizing transmitter and indicator windings having different impedances, as required with the arrangement shown in Fig. 2. In this modification of the compensator coupling windings 31 and 32 are connected in parallel with the transmitter coupling windings 7 and 8 and the indicator coupling windings 18 and 19 as with the arrangement shown in Fig. 2. However, in order to prevent the flow of compensating current in the indicator coupling windings, the compensator core is provided with additional sets of coupling windings 39 and 40 which are connected in series respectively with the indicator coupling windings 18 and 19 between the indicator coupling windings and the compensator coupling windings 31 and 32, as best shown in the simplified wiring diagram shown in Fig. 4 of the drawing. The compensator coupling windings 31 and 39 are wound co-extensively on the core 38 so that equal second harmonic voltages are induced in them. The polarities of the windings 31 and 39 are selected such that they are in series opposition with reference to the circuit including the coupling windings 31 and 39 and including the indicator coupling winding 18. With this arrangement the compensator coupling winding 31 is effective to produce a flow of compensating current in the transmitter coupling winding 7 but cannot produce a flow of compensating current in the indicator winding 18. In a similar manner, the compensator coupling windings 32 and 40 are wound coextensively on the core 28 so that equal second harmonic voltages are induced in them and their polarities are selected such that they are connected in series opposition in the circuit including the compensator coupling windings 32 and 40, and the indicator coupling winding 19. The compensator coupling winding 32 is therefore effective to cause a flow of compensating current in the transmitter coupling winding 8, but cannot produce any flow of compensating current in the indicator coupling coil 19. Therefore, it will be seen that with this arrangement the compensator 27 can be utilized to produce a compensating unidirectional field across the diameter of the transmitter core for compensating for the effect of permanently magnetized body in the vicinity of the transmitter without producing a corresponding unidirectional field across the core of the indicator which would tend to throw off the indicator magnet 23 and thereby give an erroneous indication.

The arrangement illustrated in Fig. 5 has been included to show that the compensator scheme of the present invention may also be applied to a second harmonic remote indicating compass system of the type utilizing autotransformer windings whereby the need for separate coupling windings is obviated. In this case the transmitter, compensator and indicator cores 3, 28 and 15 are provided with uniformly wound windings 41, 42 and 43, the end or single phase connections of which are all connected to the common source of alternating current supply at 6. In this case the first and second polyphase connections are obtained by tapping the windings 41, 42 and 43 at the points 45, 46, 47, 48, 49 and 50, respectively. One side of the alternating current supply line 6a is used as the third polyphase connection which is common to all of the windings 41, 42 and 43. The compensator polyphase connections 6a, 47 and 48 are connected in parallel with the transmitter polyphase connections 6a, 45 and 46, and the indicator polyphase connections 6a, 49 and 50. In this modification the operation of the compensator 27 is exactly the same as that described in connection with Fig. 2 of the drawing, the only difference being that an equivalent winding arrangement is utilized wherein the exciting current and the second harmonic currents both flow in the same winding rather than in separate windings as in the case where coupling windings are used. The present invention is not limited in use to a remote indicating compass system in which pivoted compass magnets such as the magnets 13 are used in the compass transmitter to amplify the effect of the earth's magnetic field on the transmitter core. The invention is equally applicable to the so-called direct pick-up type of transmitter, wherein the transmitter is made sufficiently sensitive to respond directly to the effect of the earth's magnetic field on the transmitter core without the amplifying effect of the compass magnets. For example, the compensator of the present invention may equally well be used with a direct pick-up type of transmitter such as that shown in a copending application of the present inventor, Serial No. 607,718 filed July 30, 1945, now Patent 2,414,128.

Thus it will be seen that there has been provided in accordance with the present invention a compass deviation compensation system comprising a relatively simple compensator unit which can easily and quickly be attached to a standard second harmonic type of remote indicating compass system without need for changing the electrical or mechanical details of the transmitter or indicator unit. The use of this invention avoids the necessity for access to a remote transmitter unit for deviation adjustment. Furthermore, by eliminating the need for deviation adjustment magnets on the transmitter, the overall size of the transmitter can be considerably reduced. Another advantage is that the deviation compensator can be located adjacent the indicator which facilitates adjustment.

While particular embodiments of this invention have been shown and described, it will occur to those skilled in the art that various changes and modifications may be made without departing from the invention, and therefore it is aimed in the appended claims to cover all such changes and modifications as fall within the true spirit and scope of the invention.

What is claimed as new and desired to secure by Letters Patent of the United States, is:

1. In a remote indicating compass system, a transmitter unit for producing signal voltages in accordance with the orientation of said transmitter unit in the earth's magnetic field, an indicator unit having a movable element positioned in accordance with the signal voltage output of said transmitter unit, a compensator unit for correcting said system for the effect of a permanent magnetic field in the vicinity of said transmitter unit, said units comprising annular cores of magnetically permeable material having similar winding means thereon with single phase and polyphase connections, the corresponding polyphase connections of all of said units being electrically interconnected, means for energizing the single phase connections of all of said units with alternating current, magnet means for producing a unidirectional magnetic field across the core of the compensator unit, and means for varying the direction and magnitude of said unidirectional field to vary the voltage output of said compensator unit.

2. In a remote indicating compass system of the type having a transmitter and indicator units energized from a source of alternating current and electrical connections between said units for transmitting position-indicating, second-harmonic signal voltages from the transmitter to the indicator, a deviation compensator comprising a closed core of magnetically permeable material having windings thereon with single phase and polyphase connections, said single phase connections being connected to said source of alternating current to cause periodic saturation of the core and said polyphase connections being electrically interposed between said transmitter and indicator units, means for producing a unidirectional magnetic flux linking the core of said compensator, said unidirectional flux being caused to pulsate due to the periodic saturation of said core whereby second harmonic voltages are induced in the compensator windings, and means for adjusting the direction and magnitude of said unidirectional magnetic flux in said compensator core to vary the magnitude and polarity of the second harmonic voltages induced in the compensator windings.

3. In a remote indicating compass system, a transmitter unit for producing signal voltages in accordance with the orientation of said transmitter unit in the earth's magnetic field, an indicator unit having a movable element positioned in accordance with the output of said transmitter unit, a compensator unit for correcting said system for the effect of a permanent magnetic field in the vicinity of said transmitter unit, each of said units comprising an annular core of permeable magnetic material having winding means thereon with single phase and polyphase connections, the corresponding polyphase connections of all of said units being electrically interconnected in series circuit relation, means for energizing the single phase connections of all of said units with alternating current, magnet means for producing a unidirectional magnetic field across the core of the compensator unit, and means for varying the direction and magnitude of said unidirectional field to vary the voltage output of said compensator unit.

4. In a remote indicating compass system, a transmitter unit, an indicator unit, a compensator unit, each of said units comprising an annular core of magnetically permeable material having an exciting winding and two sets of coupling windings thereon, the coupling windings of each set being connected in series and said coupling windings being arranged in quadrature relation, circuit means connecting the corresponding sets of windings of each of said units in series circuit relation, a first magnet means for producing a unidirectional magnetic field in the compensator core linking one set of compensator coupling windings, a second magnet means for producing a unidirectional magnetic field in the compensator core linking the other set of compensator coupling windings, and means for separately adjusting said first and second magnet means so as to vary the direction and magnitude of the magnetic flux produced thereby linking the associated compensator coupling windings.

5. In a remote indicating compass system, a transmitter unit for producing signal voltages in accordance with the orientation of said transmitter unit in the earth's magnetic field, an indicator unit having a movable element positioned in accordance with the output of said transmitter unit, a compensator unit for correcting said system for the effect of a permanent magnetic field in the vicinity of said transmitter unit, each of said units comprising an annular core of permeable magnetic material having similar winding means thereon with single phase and polyphase connections, the corresponding polyphase connections of all of said units being electrically interconnected in parallel relation, means for energizing the single phase connections of all of said units with alternating current, magnet means for producing a unidirectional magnetic field across the core of the compensator unit, and means for varying the direction and magnitude of said unidirectional field to vary the voltage output of said compensator unit.

6. In a remote indicating system, a transmitter having a coil in which signal voltages are induced, an indicator having a movable element actuated in response to energization of a coil forming a part thereof, the coils of said transmitter and indicator being electrically interconnected, means for producing a flow of compensating current in the transmitter coil and for preventing a flow of said current in the indicator coil comprising a compensator having first and second coils in which equal voltages are induced, the first of said compensator coils being connected in parallel with said transmitter and indicator coils and the second of said compensator coils being connected in series with said indicator coil between said indicator coil and said first compensator coil, said compensator coils being connected in series opposition whereby said first compensator coil produces a flow of current in said transmitter coil but does not produce a flow of current in said indicator coil.

7. In a remote indicating compass system a transmitter unit for producing signal voltages in accordance with the orientation of said transmitter unit in the earth's magnetic field, an indicator unit having a movable element positioned in accordance with the output of said transmitter unit, a compensator unit for correcting said system for the effect of a permanent magnetic field in the vicinity of said transmitter unit, each of said units comprising an annular core of magnetically permeable material having an exciting winding connected to a common source of alternating current, said transmitter and indicator cores having also electrically interconnected coupling windings thereon and the core of said compensator having first and second coupling windings wound coextensively on the core, the first of said compensator coupling windings being connected in parallel with the coupling windings of the transmitter and indicator units and the second of said compensator coupling windings being connected in series with the coupling winding of the indicator unit between the first compensator coupling winding and the indicator coupling winding, and means for producing a magnetic flux linking the coupling windings of the compensator whereby equal voltages are induced in the first and second compensator windings, said compensator windings being connected in series opposition whereby said first compensator winding causes a flow of compensating current in the transmitter coupling winding but does not cause a flow of compensating current in the indicator coupling winding.

8. In a remote indicating compass system a compass transmitter unit, an indicator unit, each of said units comprising an annular core of magnetically permeable material having winding means thereon with single phase and polyphase connections, the polyphase connections of said units being electrically connected, a pivoted compass magnet associated with said transmitter core, a pivoted magnet associated with said indicator core, means for energizing said single phase connections of said units from a common source of alternating current whereby second harmonic currents flow between said units causing the indicator magnet to move in angular correspondence with the compass magnet, and a deviation compensator for producing across the diameter of the core of said transmitter unit a magnet field in opposition to the magnetic field produced by a permanently magnetized body in the vicinity of the transmitter whereby said compass and said indicator magnets indicate the true direction of the earth's magnetic field, said deviation compensator comprising a second harmonic voltage-generating device electrically connected to the polyphase connection of said winding means on the transmitter unit core.

9. In a remote indicating compass system a compass transmitter unit, an indicator unit, each of said units comprising an annular core of magnetically permeable material having winding means thereon with single phase and polyphase connections, the polyphase connections of said units being electrically connected, a pivoted compass magnet associated with said transmitter core, a pivoted magnet associated with said indicator core, means for energizing said single phase connections of said units from a common source of alternating current whereby second harmonic currents flow between said units causing the indicator magnet to move in angular correspondence with the compass magnet, and a deviation compensator for producing across the diameter of the core of said transmitter unit a magnet field in opposition to the magnetic field produced by a permanently magnetized body in the vicinity of the transmitter whereby said compass and said indicator magnets indicate the true direction of the earth's magnetic field, said deviation compensator comprising a second harmonic voltage-generating device electrically connected to the polyphase connections of said winding means on the transmitter unit core, and compensation adjusting means for varying the polarity of magnitude of the voltage output of said deviation compensator.

ANNA C. SINKS,
*Administratrix of the estate of Allen T. Sinks, deceased.*

REFERENCES CITED

The following references are of record in the file of this patent:

UNITED STATES PATENTS

| Number | Name | Date |
|---|---|---|
| 2,389,146 | Fragola et al. | Nov. 20, 1945 |
| 2,405,050 | Pfuntner et al. | July 30, 1946 |